June 24, 1930.  M. TIBBETTS  1,766,847

OIL FILTER FOR INTERNAL COMBUSTION ENGINES

Filed Nov. 20, 1924

Inventor:
Milton Tibbetts

Patented June 24, 1930

1,766,847

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

OIL FILTER FOR INTERNAL-COMBUSTION ENGINES

Application filed November 20, 1924. Serial No. 751,009.

This invention relates to internal combustion engines and particularly to the lubrication system thereof and to means for straining or filtering the lubricant.

One of the objects of the invention is to simplify the oil filtering mechanism of an internal combustion engine.

Another object of the invention is to provide an engine oil filtering mechanism with means for reversing the flow of oil through the filtering material to thereby cleanse the filter.

Another object of the invention is to provide means for cleaning the filter while at the same time maintaining oil feed to the engine bearings.

Another object of the invention is to provide oil filtering means for the oiling system of an internal combustion engine together with by-pass means for the system conveniently arranged in the filtering mechanism.

Another object of the invention is to provide filter mechanism with means for reversing the flow of oil through the filter and opening the filter casing to the atmosphere so that the dirt may be readily eliminated.

Another object of the invention is to provide a filtering mechanism with by-pass means accessible for ready adjustment.

Other objects of the invention will appear from the following description taken in connection with the drawings, which form a part of this specification, and in which.

Figures 1, 2, 3:
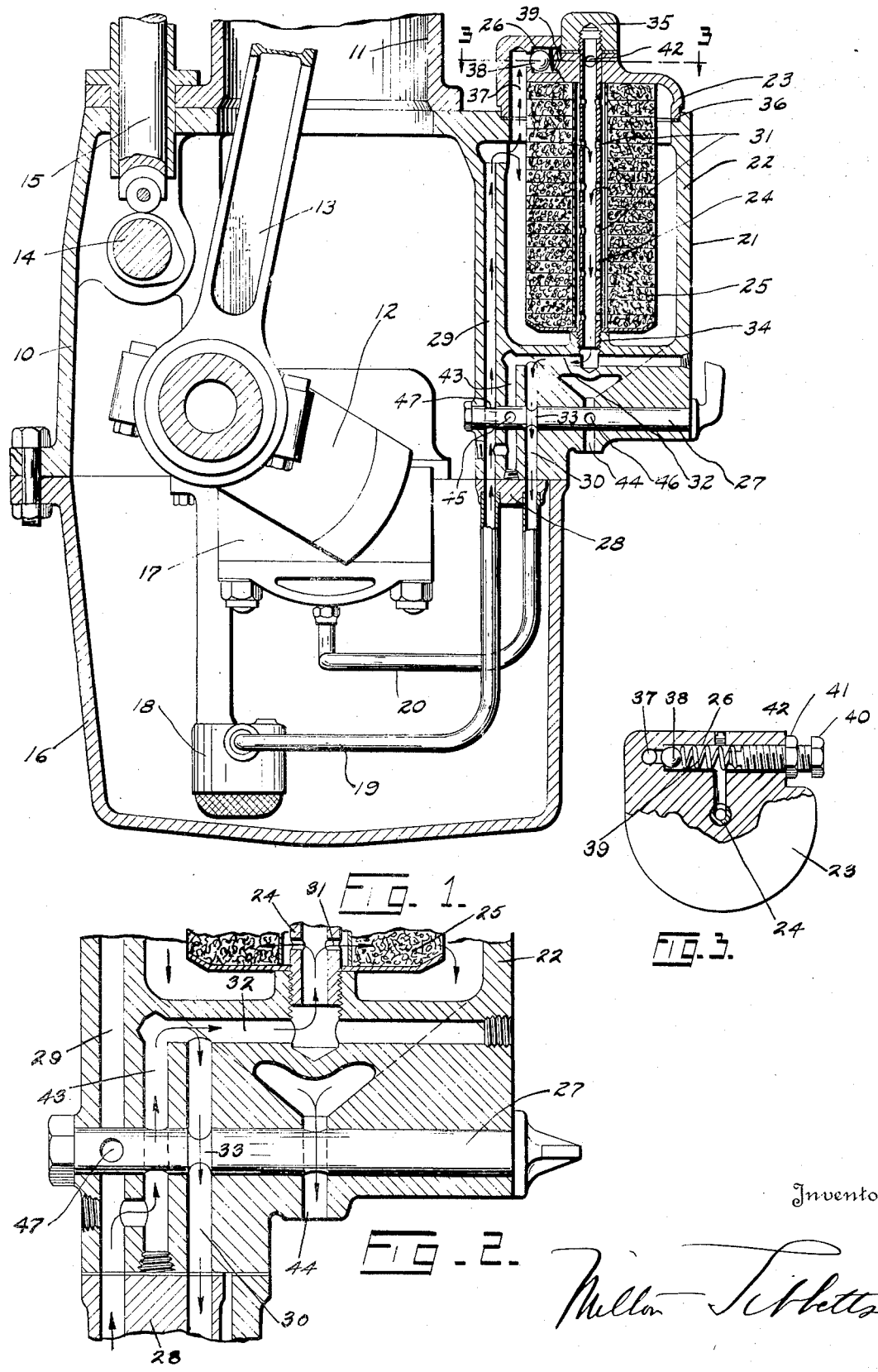
Fig. 1 is a transverse section through the lower portion of an internal combustion engine embodying the invention.
Fig. 2 is an enlarged section through the valve means and adjacent passages of the filter, with the valve in a position different from that of Fig. 1.
Fig. 3 is a horizontal section substantially on the line 3—3 of Fig. 1.

Referring to the drawings, 10 represents the crankcase of an internal combustion engine, 11 is a cylinder or cylinder block mounted on the crankcase, 12 is the engine crankshaft, 13 is a connecting rod, 14 is the camshaft, and 15 represents a valve tappet of usual construction. The lower part 16 of the crankcase forms an oil well for collecting the oil thrown from the various bearings of the engine. 17 is one of the crankshaft main bearings which is arranged for lubrication under pressure. 18 is an oil pump which may be driven in any suitable way from one of the moving parts of the engine. A pipe 19 leads from the oil pump to the filtering mechanism hereinafter described and 20 is a pipe leading from the filtering mechanism to the engine bearings 17.

The filtering mechanism of the system is represented generally by the number 21 and it comprises as its principal parts a casing 22 which is shown as formed as an integral part of the upper half of the crankcase 10, a cover 23, a tube 24 connecting the cover to the casing and forming a part of the outlet conduit of the filter, a filter block 25 shown as comprising a series of discs of filter material surrounding the tube 24, and a by-pass valve mechanism 26 arranged in the cover 23. A valve 27 in the lower part of the filter casing is arranged to control the various ports of the filter as will be hereinafter more fully described.

The pipes 19 and 20 are connected to the filter casing 21 by a block 28 which is secured to the casing so that the pipe 19 communicates with a passage 29 and the pipe 20 communicates with the passage 30, the passage 29 being the intake passage of the filter and the passage 30 being the outlet passage thereof. The passage 29 communicates with the interior of the filter casing 22 some distance above the bottom thereof so that oil is fed from the pump 18 directly to the filter casing. The pipe or tube 24 is formed with a series of openings 31 so that the oil which passes through the filter material 25 will pass into the tube 24 and downwardly into a passage 32 which leads around a contracted portion 33 of the valve 27 and communicates with the outlet conduit 30. The tube 24 also forms the mechanical connection for the cover 23 to the casing 22. It is threaded into the casing as shown at 34 and upon the upper end of the tube is a threaded cap 35 by which the cover is forced down onto the casing to make a tight joint at 36 and the felt or other filtering material 25 is compressed.

In order that the engine may be assured of lubrication even though the filter should become clogged, an automatically controlled by-pass 37 is provided in the cover 23, this by-pass extending around the filtering material 25 to the outlet tube 24. In the by-pass 37 is a check or relief valve shown as a ball 38 with a light spring 39 behind it and a plug 40 threaded so that the tension of the spring may be adjusted. A lock nut 41 holds the plug 40 in adjusted position. The by-pass 37 is continued beyond the relief valve by means of a port or passage 42 leading into the tube 24. These parts are illustrated in Figs. 1 and 3.

The valve 27 is shown in normal position in Fig. 1 and it will be seen that the pump 18 will convey oil under pressure from the crankcase through the tube 19 and passage 29 to the filter casing. As long as the filtering material 25 is sufficiently free of dirt the oil will pass through the filter into the tube 24, through the passage 32 and around the contracted part 33 of the valve and into the outlet 30 and the tube 20 to the bearings 17 of the engine. If the resistance of the filtering material is too great oil will be by-passed through the passage 37 by reason of the opening of the valve 38 and this oil will pass through the port 42 into the tube 24 and thence to the engine bearings as above described, thus assuring oil to the bearings under all conditions.

Means are also provided for cleaning out the filter without removing the filtering material. A manually controlled by-pass or passage 43 is arranged between the inlet passage 29 and the outlet passage 30 and a waste passage 44 is provided at the bottom of the casing 22. These passages 43 and 44 as well as the inlet passage 29 are shown as controlled by the valve 27 above described. Openings 45 and 46 in the valve 27 control the passages 43 and 44 respectively and an opening 47 controls the passage 29, the opening 47 being arranged at right angles to the openings 45 and 46.

The passage of the oil through the system, in the normal operation of the engine, has been described above, the valve 27 being shown in its normal position in Fig. 1. In Fig. 2 the valve 27 has been turned ninety degrees so that the passage 29 is closed and the passages 43 and 44 are open. With the engine running and the pump 18 therefore in operation, and with the valve 27 in the position shown in Fig. 2, the oil will be reversed through the filter material 25 and the dirt which falls from the filter material will drop down to the bottom of the casing 22 and pass out at the passage 44. Thus the oil will pass through the pipe 19 to the lower part of the inlet passage 29, thence through the opening 45 and by-pass 43 to the passage 32, thence upwardly through the tube 24 and its openings 31 through the filter material to the casing 22. This oil cannot by-pass through the passage 37 in this direction because of the check valve 38. The engine will be continued in operation for a short while only as the dirt and dirty oil from the filter will very quickly flow out through the passage 44. As soon as the valve 27 is turned back to the position shown in Fig. 1 the oil will again flow normally through the system as before described.

It will be noted that by reason of the resistance of the filter material to the flow of oil through it during this cleaning operation, some oil will be fed to the bearings of the engine through the outlet passage 30 and pipe 20, because in either position of the valve 27 the oil will be fed to the outlet 30, the contracted part 33 of the valve 27 leaving this passage always open. Thus the engine will be assured of receiving some oil to its bearings during the cleaning operation.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

In a filter, dual inlet and outlet passages for conducting the liquid to be filtered to and from the filter, one of said inlet passages being adapted to cause liquid to pass in one direction through the filter, the other of said inlet passages being adapted to cause liquid to pass in the reverse direction through the filter to clean the filter, one of said passages being adapted to conduct liquid from the filter to the device in which the liquid is to be used, the other outlet passage being adapted to conduct liquid and any foreign matter mixed therewith from the filter to the atmosphere, and a valve for controlling all of the passages, said valve in one position being adapted to open an inlet and an outlet passage and in another position to open an inlet and two outlet passages.

In testimony whereof I affix my signature.

MILTON TIBBETTS.